United States Patent

[11] 3,557,349

[72] Inventor Paul D. Griem, Jr.
Newark, Ohio

[21] Appl. No. 690,162
[22] Filed Dec. 13, 1967
[45] Patented Jan. 19, 1971

[73] Assignee Owens-Corning Fiberglas Corporation
a corporation of Delaware

[54] METHOD AND APPARATUS FOR PROCESS CONTROL
18 Claims, 5 Drawing Figs.

[52] U.S. Cl. .................... 235/151.1, 340/413, 340/186, 340/167
[51] Int. Cl. .................... H04g 3/00, G05b 15/00
[50] Field of Search .................... 340/150, 151, 172.5, 314, 179, 183; 235/151.1; 179/15BWR, 15LL, 15

[56] References Cited

UNITED STATES PATENTS

| | | | |
|---|---|---|---|
| 2,981,107 | 4/1961 | Anderson .................... | 73/341 |
| 3,311,886 | 3/1967 | Herman et al .................... | 340/172.5 |
| 3,391,275 | 7/1968 | Bullock et al. .................... | 235/151.1 |

*Primary Examiner*—Eugene G. Botz
*Attorney*—Staelin and Overman

ABSTRACT: Method and apparatus for producing glass fibers including a plurality of bushings for feeding streams of molten glass through orifices formed therein. A control loop is provided for each bushing for controlling the amount of electrical power supplied to the bushing and includes means for sensing the temperature of the bushing and power regulating means for the bushing. Data processing means is operative to receive a signal from a temperature sensing means of a control loop and to provide a corrective control signal to the power regulating means for that loop. Means selectively connect the data processing means to individual loops in a predetermined sequence to most effectively utilize the control time of the data processor.

INVENTOR.
PAUL D. GRIEM, JR.
BY
Staelin & Overman
ATTORNEYS

INVENTOR.
PAUL D. GRIEM, JR.
BY Staelin & Overman
ATTORNEYS

| LOOP # | SCAN TIME IN SECONDS | PHASE NUMBER (CLOSEST TO ZERO COUNT | | | | COUNT 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|---|---|---|---|---|
| 1 | 8 | 0 | 0 | 0 | 0 | X | | | | | | | | X | | | | | | | |
| 2 | 8 | -1 | +15 | -15 | +1 | | X | | | | | | | | X | | | | | | |
| 3 | 8 | -2 | +14 | -14 | +2 | | | X | | | | | | | | X | | | | | |
| 4 | 8 | -3 | +13 | -13 | +3 | | | | X | | | | | | | | X | | | | |
| 5 | 8 | -4 | +12 | -12 | +4 | | | | | X | | | | | | | | X | | | |
| 6 | 8 | -5 | +11 | -11 | +5 | | | | | | X | | | | | | | | X | | |
| 7 | 8 | -6 | +10 | -10 | +6 | | | | | | | X | | | | | | | | X | |
| 8 | 8 | -7 | +9 | -9 | +7 | | | | | | | | X | | | | | | | | X |
| | | UP LAG | UP LEAD | DOWN LAG | DOWN LEAD | | | | | | | | | | | | | | | | |

Fig. 3

INVENTOR.
PAUL D. GRIEM, JR.
BY Staelin & Overman
ATTORNEYS

PATENTED JAN 19 1971

3,557,349

| LOOP # | SCAN TIME IN SECONDS | PHASE LAG | COUNT (CYCLE →) 0 | 1 | 2 | 3 | 4 | 5 | 6 | 7 |
|---|---|---|---|---|---|---|---|---|---|---|
| 1 | 4 | 0 | X | | | | X | | | |
| 2 | 4 | -2 | | | X | | | | X | |
| 3 | 2 | -1 | | X | | X | | X | | X |

Fig. 4

| LOOP # | SCAN TIME IN SECONDS | PHASE LAG | COUNT (CYCLE →) 0 | 1 | 2 | 3 | 4 | 5 | 6 | 7 |
|---|---|---|---|---|---|---|---|---|---|---|
| 1 | 4 | 0 | X | | | | X | | | |
| 2 | 4 | -1 | | X | | | | X | | |
| 3 | 8 | -2 | | | X | | | | | |
| 4 | 8 | -3 | | | | X | | | | |
| 5 | 8 | -6 | | | | | | | X | |
| 6 | 8 | -7 | | | | | | | | X |

Fig. 5

INVENTOR.
PAUL D. GRIEM, JR.
BY Staelin & Overman
ATTORNEYS

METHOD AND APPARATUS FOR PROCESS CONTROL

When a glass furnace, a plurality of bushing feeders, or any other process is controlled by a data processing means such as a computer, it is necessary to sense the actual status of each of the conditions in the process and through the use of the data processing means provide corrective signals for controlling each condition. The sensing or sampling of the actual status of the various conditions is generally done at different times which are not in sequence. Further, the polling or sampling for each condition may have different time spacings. It thus becomes necessary to take more readings because of the different relationships and the spacing between the inputs or sensing signals, thus requiring additional data processing capacity in order to take sensing signals or inputs at the desired time intervals and perform the correcting signal operations on a continuing basis. Data processing equipment generally has count periods representing the smallest time spacing between possible computer operations. To utilize the computer most efficiently each count period should be used for performing a sampling or control operation.

If the data processing equipment in use has 100 channels, it is obvious that it could control 100 loops. That is, a control loop could be assigned to each channel without regard to the time spacing or scan time between sampling or control operations of an individual loop. It is desirable to select loops having spaced scan times so that a plurality of loops might be controlled by each channel, preferably wasting as few of the count periods for that channel as possible. That is, a number of loops with spaced scan times should be sequenced with respect to each other so that as many of the count periods of the data processing equipment are used as possible.

It is, accordingly, an object of this invention to provide improved process control apparatus and an improved method for controlling a process.

It is a further object of this invention to provide improved method and apparatus for controlling a process in which the spacing of work time for a data processing unit is balanced so that more control loops can be connected to a particular data processing means.

It is another object of this invention to provide an improved method of and apparatus for process control in which the relationship between control loops may be fixed to improve the balance and operation of the system as well as make best use of data processing or control time.

It is still another object of this invention to provide an improved method of and apparatus for producing glass fibers in which a plurality of control loops are required, wherein a data processing unit may be used having a smaller capacity than heretofore possible.

In order to obtain the above objects the invention features process control apparatus comprising a plurality of control loops for sensing and modifying conditions in the process, each loop having a preset number of control time increments of spacing between control operations on the associated condition. Data processing equipment is utilized along with means for selectively connecting the control loops to the data processing equipment. The selective connecting means may include a cyclic counter operative to change its count by one at the beginning of each increment of control time and storage means for the numbers of time increments between control operations for each loop. In addition, storage means for a phase number within the cycle for each control loop is shown, the phase number for each loop being assigned so that when combined with a particular counter number by an operation sign depending upon the direction the counter is cycling a result is obtained which is divisible by the spacing number to produce an integer, each loop being assigned a different phase number. Means responsive to the passage of each increment of control time mathematically combines the counter number with the phase number of each loop and divides each result by the corresponding spacing number for each loop. Means responsive to the occurrence of an integer quotient connects the loop having the phase number producing the integer quotient to the data processing means.

If the cyclic counter means counts from zero up in its cycle, the mathematical combining means may include means for separately subtracting each phase number from the count number in the counter means. If the cyclic counter means counts down toward zero, the mathematical combining means may include means for separately adding each phase number to the count number in the counter means. Periodic signals may be produced for incrementing the cyclic counter means. Sequencing means responsive to the periodic signal means and multiplexing means responsive to the sequencing means may be utilized for connecting the phase number and spacing number storage means to the mathematical combining means.

The method of controlling a process, which may utilize the above apparatus, will be described hereinafter.

Other objects, advantages, and features of this invention will become apparent when the following description is taken in conjunction with the accompanying drawings, in which:

FIG. 3 is the layout for the process control of eight loops, each having the same scan times, in a repeating polling cycle;

FIG. 4 is a layout for a polling cycle for three loops, having different scan times, according to the teachings of this invention; and FIG. 5 is a layout for six loops, having varying scan times, in a cycle according to the teachings of this invention.

It is to be noted that while the invention will be described herein with respect to a glass fiber process and apparatus, for which the invention is particularly applicable, it is equally applicable to other process control methods and apparatus wherein a plurality of control loops are included which have spaced and sometimes different scan times.

Figure 1:
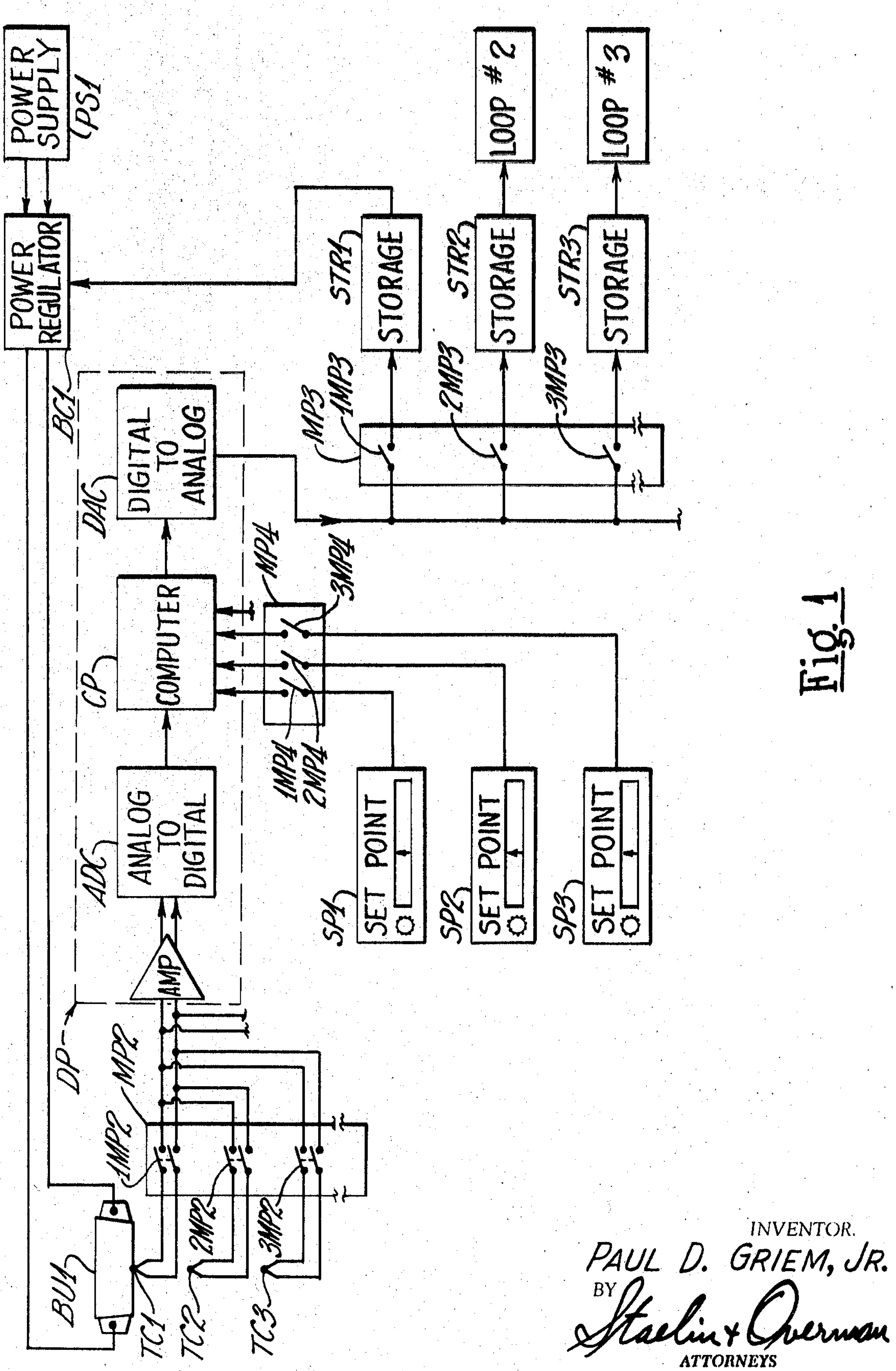
FIG. 1 is a diagrammatic layout of the process illustrating control apparatus which embodies the teachings of this invention.

Referring to the drawings there is illustrated in FIG. 1 a bushing feeder BU1 having electrical power from power supply PS1 supplied thereto via power regulator BC1 to heat the bushing BU1 to maintain a supply of glass molten therein and at the correct temperature for attenuation of streams of molten glass that flow through feeder orifices formed in the bottom wall of the bushing.

If only one bushing were being controlled, a thermocouple TC1 or other heat sensing and signal producing means would be utilized to sense the actual temperature of the bushing. The temperature signal would be connected to a data processing means DP which may include an amplifier for increasing signal strength, an analog-to-digital converter ADC if the computer section is a digital computer, and a computing means CP. A desired operating point is noted by a signal supplied from a set point device SP1 which is connected to the computer CP. Although the set point signal generators are shown as separate items herein for the purposes of clarity, it is to be understood that in a digital computer such information could be stored in a storage register for comparison with the actual temperature signal from the thermocouple TC1.

The computer CP derives a corrective signal, if necessary, from the comparison of the set point temperature and actual temperature of the bushing BU1 and provides the correction signal to a digital-to-analog converter DAC. The output of converter DAC is connected to a storage means STR1. The storage means STR1 for the loop number 1 is connected to supply a signal to the power regulator BC1 which then increases, decreases or makes no change in the amount of power being supplied to the bushing BU1 depending upon the signal stored therein. Thus, thermocouple TC1, storage unit STR1, and power regulator BC1 may be considered individual loop number one for controlling the temperature of bushing BU1.

If it were necessary for the temperature of the control loop number one to be sensed every count period or computation period of the data processing equipment DP, it is obvious that one channel of the data processing means represented in FIG.

1 would be busy 100 percent of the time and the best possible use of the data processing equipment would be effected. However, it is frequently not necessary to scan the actual status of a condition every count or computation period of the data processing equipment and provide a correction therefor, since the response time required for changes to be effected in the condition being controlled and the response time of the control loop performing the control operation are such that additional samplings or control operations in time periods less than the response time of the loop would be wasted and unnecessary. For example, the time between scanning, in the control of a bushing, may be 8 seconds because of the response time of the control loop and the response time for changes to be effected in the temperature of the bushing. Thus, if the data processing equipment required only 1 second to perform the calculations necessary, there would be seven count or computation periods between scans for the control loop which would not be utilized. If separate channels of data processing equipment were required for each control loop and/or for each bushing being controlled, then it can be seen that if eight bushings were being controlled eight times as many data processing channels would be required.

This invention then is directed to method and apparatus for establishing the occurrence of a plurality of control functions of a process, each function having a preset number of control time increments between occurrences designated as scan time for that function, and a repeating cycle of the time increments numbered in sequence from zero. A cycle is established having the same number as or a multiple of the number of increments in the scan time for the least frequently occurring of the control functions. A phase relationship for each function within the cycle with respect to the zero increment of the cycle is calculated from the equation $$\frac{\text{cycle count number} \pm (\pm \text{phase number})}{\text{scan time number}} = \text{integer} \qquad (1)$$

The mathematical operation sign in the equation is positive when the increments in the cycle are enumerated in sequence up from the zero increment and the operation sign is negative when the increments in the cycle are enumerated in sequence down towards the zero increment. The sign of the phase number is positive when the phase is expressed as the number of increments occurring in the cycle before arriving at the zero increment in the direction of enumeration, that is, the lead time is expressed in the number of counts or increments. The phase number is negative when the phase is expressed as the number of increments occurring in the cycle after arriving at the zero increment in the direction of enumeration, that is, the lag time is expressed in the number of counts or increments occurring after passing through zero before arriving at the count where the operation is to be performed.

The control functions may be selected as the cycle progresses by solving the equation with the phase and scan time number for each control function each time the cycle moves to the next increment, the occurrence of an integer quotient signaling the appearance of that control function at that time increment in the cycle.

Equation (1) represents the combination of two equations, a first equation to be utilized when counting up from zero and the second equation to be utilized when counting down towards zero as follows:

$$\text{(counting up)} \quad \frac{C+(\pm P)}{\text{scan time}} = \text{integer} \qquad (2)$$

$$\text{(counting down)} \quad \frac{C-(\pm P)}{\text{scan time}} = \text{integer} \qquad (3)$$

In each of the equations (2) and (3) above the +P represents a phase lead, the number of counts before zero, and the −P represents the phase lag, the number of counts after zero, the lead and lag to be counted in the direction that the counting is being done toward or from zero.

Referring to FIG. 3 there is illustrated in detail the effect of using equation (1) and laying out the occurrence of eight control loops in a polling cycle. For simplicity each control loop is assumed to have a scan time of 8 seconds. It is further assumed that the necessary calculations may be performed by the data processing equipment within a 1-second time increment. Accordingly, a cycle having 16 time increments, numbered in sequence from 0 through 15 has been chosen. In this instance the count cycle has a multiple of the number of time increments between the least frequently occurring of the control operations to be scanned. That is, since the scan time for all control functions is 8 seconds, the choice of 16 time increments is obviously a multiple of the longest scan time. Although it would be possible in the example illustrated in FIG. 3 to utilize a count cycle including only eight increments, the count cycle has been chosen to include 16 increments to illustrate that this count or polling cycle may be set so that other count cycles including control functions having scan times of 16 seconds may be included in the process so that only one counter is required to provide a count for the various channels of the data processing equipment.

Under the phase number section of the layout in FIG. 3 there is shown four columns in which the phases have been calculated in phase lag and phase lead of occurrence for count or polling cycles which proceed up from or down toward the zero count. The numbers in the columns of the phase number section express the phase with respect to the occurrence of the control function closest to the zero count.

In column one it is assumed that the count cycle is proceeding up from zero and that the lag of the occurrence of the control operation after the zero count is set forth. It can be thus seen that equation (2) now becomes $$\frac{C+(-P)}{\text{scan time}} = \text{integer} \qquad (4)$$

For loop 4, equation (4) is solved by substituting the values from FIG. 3 as follows:

$$\frac{3+(-3)}{8} = 0$$

Zero is an integer, therefore the occurrence of the operation on count 3 of the cycle with a lag of −3 is correct. The second occurrence of the control operation for loop 4 is on count 11, which when having the lag time of −11 added thereto again provides a zero for division by the scan time and again results in a zero quotient, or an integer.

Referring to column two the count cycle is proceeding up from zero and the phase is expressed in lead time. Thus the equation (2) becomes $$\frac{C+(+P)}{\text{scan time}} = \text{integer} \qquad (5)$$

Looking again at loop 4 it can be seen that the occurrence of the control operation on count 3, when expressed as lead time, is 13 counts before zero, thus resulting in a phase of +13. The solution of the equation (5) is then $$\frac{3+(+13)}{\text{scan time}} = 2$$

Since 2 is an integer, the occurrence on count 3 of the cycle is correct.

Referring to column three the phase number is expressed in terms of lag and the cycle is counting down towards zero. Equation (3) then becomes $$\frac{C-(-P)}{\text{scan time}} = \text{integer} \qquad (6)$$

Looking once more to loop 4 and solving equation (6) with the values shown in the layout in FIG. 3 it can be seen that $$\frac{3-(-13)}{8} = 2$$

Again we have an integer and the occurrence of the control operation on count 3 is correct.

Finally, column four represents phase numbers arrived at when counting down in the cycle wherein the phase is expressed in lead time. Equation (3) thus becomes $$\frac{C-(+P)}{\text{scan time}}=\text{integer} \quad (7)$$

Solving equation (7) with the values set forth for loop 4 in FIG. 3 it can be seen that $$\frac{3-(+3)}{8}=0$$

The zero is an integer and therefore the values and occurrences for loop 4 as shown in FIG. 3 are correct.

Figure 2:
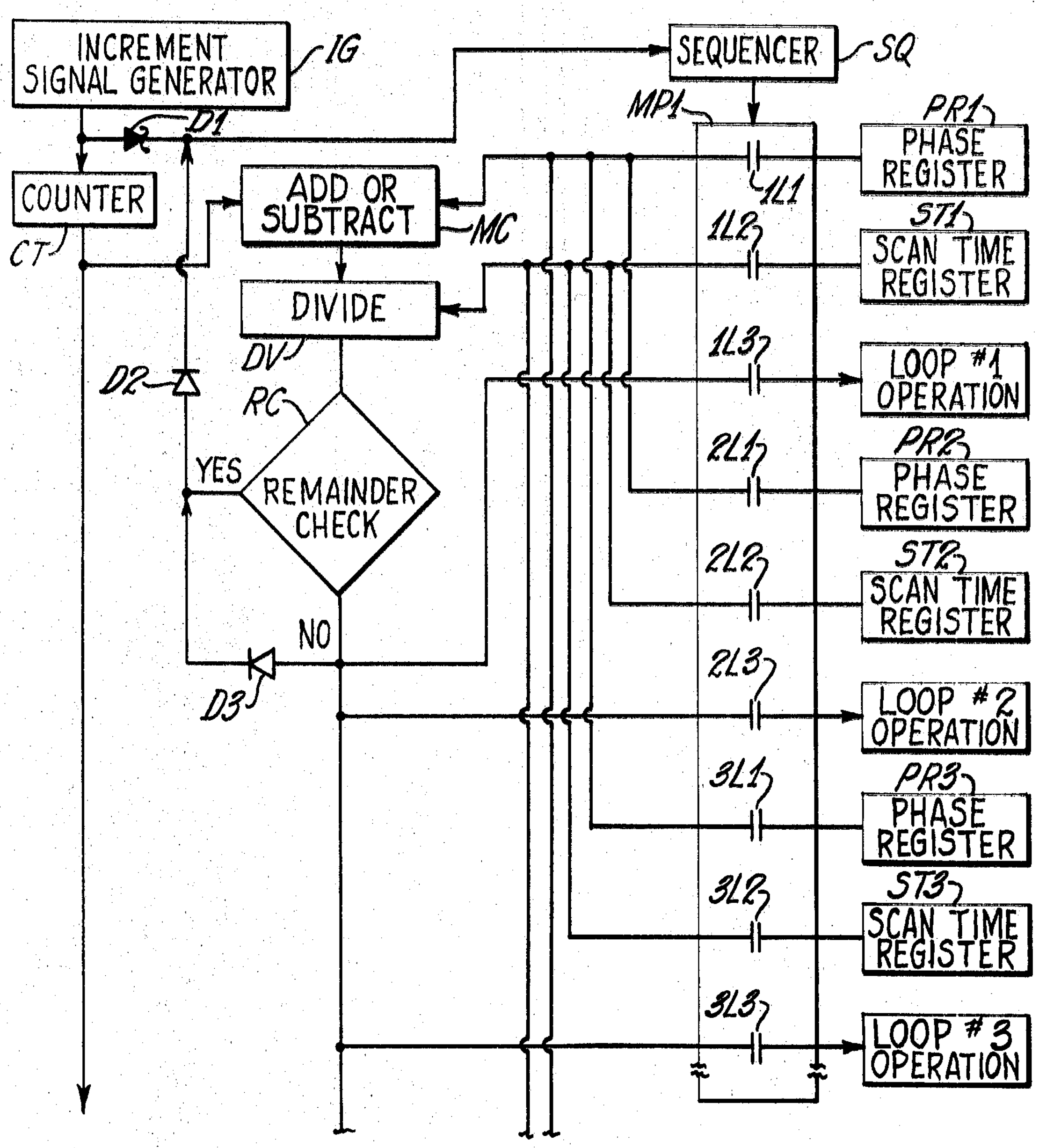
FIG. 2 is a diagrammatic layout of loop operation selecting equipment which may be utilized with the process control apparatus of FIG. 1.

Referring to FIG. 2 there is illustrated process control apparatus for carrying out the method. An increment signal generator IG provides a periodic signal to increment counter CT one count for each control time increment. The phase numbers for control loop number 1, control loop number 2, control loop number 3, etc. are stored in phase registers PR1, PR2, PR3, etc., respectively. Similarly, the scan time numbers for loop number 1, loop number 2, loop number 3, etc., are stored in scan time registers ST1, ST2, ST3, etc., respectively.

A mathematical combining means MC is provided to add or subtract the phase number for a control loop from the count in counter CT, the sign of the operation depending upon the direction in which the count cycle is being enumerated. Dividing means by DV is provided to divide the resulting number by the scan time number for the loop. A remainder check circuit RC checks the resulting quotient and provides a selection signal for the loop in response to an integer quotient. A multiplexer MP1 is provided to sequentially connect the phase and scan time numbers from the storage resistors for the loops to the combining means MC and the divider DV, in response to a signal from a sequencer SQ.

In operation a first periodic signal from the increment signal generator IG is connected to counter CT to increment the count by one in the counter CT. The periodic signal is also supplied through an isolating diode D1 to the sequencer SQ. The sequencer, in response to the increment signal closes contacts 1L1, 1L2, and 1L3. The phase number is thus connected through contact 1L1 from register PR1 to the mathematical combining unit MC where it is added or subtracted from the count in the counter according to the equations discussed hereinbefore. The scan time number in register ST1 is connected through contact 1L2 to the division circuit DV wherein the result from the mathematical combining unit MC is divided by the scan time number.

The remainder check circuit RC checks the quotient resulting from the division by the scan time number for loop number 1 and, if an integer quotient results an output is provided through contact 1L3 to signal the selection of loop number 1. The selection signal from the remainder check circuit RC is also connected through isolating diodes D3 and D2 to the sequencer SQ to signal that the IL contacts of the multiplexer MP1 may be opened and that contacts 2L1, 2L2 and 2L3 for loop number 2 may be closed. The operations just described are then repeated.

If the remainder check circuit RC detects a remainder in the loop quotient, a sequencing signal is supplied through isolating diode D2 to the sequencer SQ to cause a selection of or an indexing to the next set of contacts in multiplexer MP1. If there is a remainder, a selection signal is not provided from the remainder check circuit.

The selection signal through the 1L3, 2L3, 3L3, etc. contacts of the multiplexer MP1 may be applied to the multiplexer MP2 to close contacts 1MP2, 2MP2, or 3MP2, respectively to connect the thermocouples TC1, TC2, or TC3 of loop number 1, loop number 2, or loop number 3, respectively, to the data processing equipment DP. Similarly, the selection signal from the apparatus illustrated in FIG. 2 may be utilized to close the correct one of the contacts 1MP4, 2MP4, 3MP4, etc., in the multiplexer MP4 to connect the set point information for that control loop to the data processing channel. Finally, in the apparatus of FIG. 1 the selection signal from the apparatus of FIG. 2 may be utilized to close contacts 1MP3, 2MP3, or 3MP3 in the multiplexer MP3 to connect the storage means STR1, STR2, or STR3, for the loop which has been selected by the apparatus of FIG. 2, so that a corrective signal may be received by the selected loop signal storage means for application to the corresponding power regulator for the bushing being controlled by the selected loop.

Thus, there is illustrated in FIGS. 1 and 2 apparatus for selecting control operations for a process comprising means for supplying increment signals, cyclic counter means operative to increment one count in response to receipt of an increment signal, means for storing the number of counts between the times of selection for each operation, means for storing the count number of the phase relation of each operation within a cycle with respect to the initial count in the cycle, means responsive to an increment signal for separately mathematically combining the cycle count with the phase relation count for each operation, means for dividing the resulting combined count for each operation by the count spacing for that operation, and means for checking the quotient for each operation for a remainder and providing an output signal in response to no remainder to select an operation. Specifically, multiplexer means are shown which are responsive to the remainder checking means for connecting the temperature sensing means and the power regulating means of the loop having the loop quotient with no remainder to the data processing means. The checking means further provides a sequencing output signal in response to a loop quotient having a remainder, the sequencing means being responsive to both selection and sequencing signals for sequentially connecting phase and scan time numbers for each loop to the mathematical combining means through the multiplexer MP1.

Referring to FIG. 4 there is illustrated a layout for a process control wherein three loops are included, two loops having a scan time of 4 seconds and the third loop a scan time of 2 seconds. It can be seen that, assuming that the cycle is counting up and that the phase number is expressed in lag relationship that, if loop number 1 is assigned a phase lag of zero an occurrence of the control operation must also occur four counts later on the sequence number 4 of the count cycle. Loop number 2 may be assigned a phase lag number of −2. Since the scan time for loop number 2 is 4 seconds, the operation of control loop number 2 must also occur on sequence number 6 in the count cycle. Loop number 3 may have its first occurrence assigned to sequence number 1 of the count cycle, providing it with a phase lag number of −1. Since loop number 3 has a scan time of two, occurrences throughout the remainder of the cycle are in spacings of two counts so that it occurs on sequence numbers 1, 3, 5, and 7 of the count cycle. It can thus be seen that a channel of data processing equipment has been fully utilized in that eight control time increments are available and eight operations are performed, one operation being performed in each increment, thus requiring only one channel of data processing equipment.

FIG. 5 is a layout based upon the same equation as utilized in FIG. 4 in which the count cycle is counted up from the zero increment and in which the phase is expressed in lag. Thus it is possible to include two loops each having a scan time of 4 seconds and four loops each having a scan time of 8 seconds in the count cycle so that a single channel may perform the calculations necessary. 100 percent efficiency is obtained since the eight control time increments in the cycle are utilized to effect the occurrence of eight control operations. While it is desirable to perform a control operation during each control time increment of a cycle, it is obvious that in an entire process it may not be possible to establish the occurrence of a control operation on every control time increment in every count cycle. For example, in the layout of FIG. 5 it is possible that only five loops would be available for the cycle described. If loop number 6 were not available, the count increment with the sequence number 7 in the count cycle would not be used to effect a control operation. However, seven-eights of the count cycle would be usefully applied which would reduce, in the present instance, the requirement for five control channels to one control channel. Thus a greater efficiency is achieved even though all of the control time increments in a cycle cannot be utilized to effect a control operation.

There has thus been described and disclosed herein method and apparatus for establishing the occurrence of each of a plurality of control functions of a process at its own time increment in a repeating cycle having time increments numbered in sequence from zero, each function having a preset number of increments between occurrences designated as a scan time for the function. A cycle is limited to the same number as or a multiple of the number of increments in the scan time for the least frequently occurring of the control functions. Phase relations within the cycle are calculated for each function with respect to the zero increment by determining a phase number which, when mathematically combined with a sequence number of an increment in the cycle by an operation sign dependent upon the direction in which the sequence numbers are being enumerated provides a result which is divisible by the scan time number of that function to produce an integer. The functions are phased within the cycle to avoid occurrence on the same control time increment.

The control operations are effected or the control functions are selected by mathematically combining the sequence number of each time increment of the cycle as the cycle progresses with the phase number of each control function in the manner described above for the calculation step and dividing the resulting number by the corresponding scan time number for each control function. The resulting quotients are checked for integers, the occurrence of an integer signaling the occurrence of a control function or the time for a control operation at that time increment in the cycle.

In conclusion it is pointed out that while the illustrated examples constitute practical embodiments of my invention, I do not limit myself to the exact details shown since modification may be made without departing from the spirit and scope of this invention.

I claim:

1. Process control apparatus comprising a plurality of control loops for sensing and modifying conditions in the process, each loop having a preset number of control time increments of spacing between control operations on the associated condition; data processing means; and means for selectively connecting said control loops to said data processing means including cyclic counter means operative to change its count by one at the beginning of each increment of control time, means for storing the spacing numbers of time increments between control operations for each loop, means for storing a phase number within the cycle for each control loop, the phase number for each loop being assigned so that when combined with a particular counter number by an operation sign dependent upon the direction the counter is cycling a result is obtained which is divisible by the spacing number to produce an integer, each loop being assigned a different phase number, means responsive to the passage of each increment of control time for mathematically combining the counter number with the phase number of each loop and dividing each result by the corresponding spacing number for each loop, and means responsive to the occurrence of an integer quotient for connecting the loop having the phase number producing the integer quotient to said data processing means.

2. Process control apparatus as defined in claim 1 in which said cyclic counter means counts from zero up in its cycle and in which said mathematical combining means includes means for separately subtracting each phase number from the count number in said counter means.

3. Process control apparatus as defined in claim 1 in which said cyclic counter means counts down toward zero and in which said mathematical combining means includes means for separately adding each phase number to the count number in said counter means.

4. Process control apparatus as defined in claim 1 which further includes means for producing periodic signals connected to increment said cyclic counter means.

5. Process control apparatus as defined in claim 4 which further includes sequencing means responsive to said periodic signal means and multiplexer means responsive to said sequencing means for connecting said phase number and said spacing number storage means to said mathematical combining means.

6. Apparatus for producing glass fibers including a plurality of bushing means for feeding streams of molten glass through feeder orifices formed therein; means for electrically heating each bushing; control loop means for each bushing means for controlling the amount of electrical power supplied to each bushing including means for sensing the temperature of the bushing and power regulating means; data processing means operative to receive a signal from a temperature sensing means of a control loop and to provide a corrective control signal to the power regulating means for that loop; and means for selectively connecting said data processing means to individual control loops including means for providing a repeating counting cycle, means for sequentially mathematically combining each count with a phase number for each control loop representing the assigned phase relation within the cycle of that control loop and for dividing the resulting combination for each loop by the corresponding scan time for that loop to provide a loop quotient, means for checking each loop quotient for a remainder and for providing a selection signal output when there is no remainder, and multiplexer means responsive to said checking means for connecting the temperature sensing means and the power regulating means of the loop having a loop quotient with no remainder to said data processing means.

7. Apparatus as defined in claim 6 in which said checking means further provides a sequencing output signal in response to a loop quotient having a remainder, and which further includes sequencing means responsive to selection and sequencing signals for sequentially connecting phase and scan time numbers for each loop to said mathematical combining means.

8. Apparatus for selecting control operations for a process comprising means for supplying increment signals, cyclic counter means operative to increment one count in response to receipt of an increment signal, means for storing the number of counts between the times of selection for each operation, means for storing the count number of the phase relation of each operation within a cycle with respect to the initial count in said cycle, means responsive to an increment signal for separately mathematically combining the cycle count with the phase relation count for each operation, means for dividing the resulting combined count for each operation by the count spacing for that operation, and means for checking the quotient for each operation for a remainder and providing an output signal in response to no remainder to select said operation.

9. In apparatus for a glass melting and fiber forming process having a plurality of conditions being controlled, each condition having a number of control time increments between control operations designated as scan time which is dependent upon the response time for changes to be effected in the condition being controlled and the response time of the control loop performing the control operation so that control of each condition is not possible on each increment of control time, means for supplying clock signals for each increment of control time, cyclic counter means operative to change its count by one in response to receipt of a clock signal, means for storing the scan time number for each of said conditions being controlled, means for storing a phase number for each of said conditions being controlled, each phase number representing the phase difference between a zero count in the counter and the count when a control operation for each condition is to be performed, means responsive to each clock signal for separately mathematically combining the count number in the counter with each of the stored phase numbers by a mathematical operation sign dependent upon the direction in which the count in said cyclic counter means is proceeding, means for dividing each of the mathematically combined numbers by the corresponding scan time number for each phase number of the combined number, and means for checking each resulting quotient for a remainder and for providing a selection signal in response to finding an integer quotient.

10. A method for establishing the occurrence of each of a plurality of control functions of a process at its own time increment in a repeating cycle having time increments numbered in sequence from zero, each function having a preset number of increments between occurrences designated as a scan time for the function, comprising the steps of limiting the cycle to the same number as or a multiple of the number of increments in the scan time for the least frequently occurring of the control functions, calculating a phase relation for each function with respect to the zero increment by determining a phase number which, when mathematically combined with a sequence number of an increment in the cycle by an operation sign dependent upon the direction in which the sequence numbers are being enumerated provides a result which is divisible by the scan time number of that function to produce an integer, and phasing the functions within the cycle to avoid occurrence on the same time increment.

11. A method as defined in claim 10 which further includes selecting the occurrence of said control functions comprising the steps of separately mathematically combining the sequence number of each time increment of said cycle as the cycle progresses with the phase number of each control function in the manner of the calculation step and dividing the resulting number by the corresponding scan time number for each control function, and checking the resulting quotients for an integer, the occurrence of an integer signalling the occurrence of a control function at that time increment in said cycle.

12. A method for establishing the occurrence of a plurality of control functions of a process, each function having a preset number of time increments between occurrences designated as scan time for that function, in a repeating cycle of said time increments numbered in sequence from zero, the cycle having the same number as or a multiple of the number of increments in the scan time for the least frequently occurring of the control functions, comprising the steps of calculating a phase relation for each function with respect to the zero increment of the cycle from the equation $$\frac{\text{Cycle Count Number} \pm (\pm \text{Phase Number})}{\text{Scan Time Number}} = \text{Integer}$$

where the mathematical operation sign in the equation is positive when the increments in the cycle are enumerated in sequence up from the zero increment and the operation sign is negative when the increments in the cycle are enumerated in sequence down toward the zero increment, and further where the sign of the phase number is positive when the phase is expressed as the number of increments occurring in the cycle before arriving at the zero increment in the direction of enumeration and the phase number is negative when the phase is expressed as the number of increments occurring in the cycle after arriving at the zero increment in the direction of enumeration and selecting control functions as said cycle progresses by solving the equation with the phase and scan time number for each control function each time the cycle moves to the next increment, the occurrence of an integer quotient signalling the appearance of that control function at that time increment in the cycle.

13. In establishing the occurrence of a plurality of control functions of a process in a repeating cycle of time increments designated in sequence from the initial increment in the cycle, where each function has a preset number of said time increments between occurrences designated as scan time for that function, and where the cycle has the same number as or a multiple of increments in the scan time for the least frequently occurring of the control functions, the system for selecting control functions at a time increment comprising means for producing a cycle count designation at each increment in the cycle; means for producing a phase designation at each increment in the cycle for each function, representing the time increment relation of each said function within the cycle with respect to the initial time increment in the cycle; means for separately mathematically combining the cycle count designation with the phase designation of each function at each time increment in the cycle; means for dividing each of the resulting combined designations for each function by the scan time designation for that function; and means for checking the quotient for each division for a remainder and selecting a function having a predetermined remainder for operation at that time increment of said cycle.

14. In establishing the occurrence of each of a plurality of control functions of a process at its own time increment in a repeating cycle having time increments numbered in sequence, where each function has a preset number of increments between occurrences designated as a scan time for the function, where the number of time increments in the cycle is the same as or a multiple of the number of increments in the scan time for the least frequently occurring of the control junctions, and where each function has a phase number designating the time increment of its occurrence within the cycle with respect to an initial time increment, the system for selecting control functions at different time increments in the cycle comprising means for separately mathematically combining the sequence number of each time increment of said cycle as the cycle progresses with the phase number of each control function in the equation $$\frac{\text{Cycle Count Number} + (+\text{Phase Number})}{\text{Scan Time Number}} = \text{Quotient}$$

wherein the operation sign is positive when the increments in the cycle are enumerated in sequence up from the initial time increment and the operation sign is negative when the increments in the cycle are enumerated down toward the initial time increment, and further where the sign of the phase number is positive when the phase is expressed as the number of increments occurring in the cycle before arriving at the initial increment in the direction of enumeration and the phase number is negative when the phase is expressed as the number of increments occurring in the cycle after arriving at the initial increment in the direction of enumeration; and means for checking the resulting quotients for a predetermined remainder and selecting a control function having said predetermined remainder for operation at the time increment of the occurrence of the predetermined remainder.

15. The system as defined in claim 14 in which the initial increment in the repeating cycle is numbered zero, the next successive increment is numbered one, and the remaining increments are numbered in arithmetic progression.

16. The method of operating data processing apparatus to select the occurrence of each of a plurality of control functions thereof at its own time increment in a repeating cyclic count of said data processing apparatus wherein the time increments are numbered in sequence from zero, each function having a preset number of increments between occurrences designated as a scan time for the function and stored in the data processing apparatus, each cycle being limited to the same number as or a multiple of the number of increments in the scan time for the least frequently occurring of the control functions, each function having a phase number stored in the data processing apparatus designating the relation of the time increment of that function with respect to the zero increment in the cyclic count, comprising the steps of connecting a computation portion of the data processing apparatus to separately mathematically combine the sequence number of each time increment of the cycle as the cyclic count progresses with the stored phase number of each control function and dividing the resulting combined number for each function by the stored corresponding scan time number for the function, checking the resulting function quotients for a remainder, and selecting a function with no remainder for operation at that time increment in said cycle.

17. The method of programming data processing apparatus to select the occurrence of each of a plurality of control functions at its own time increment in a repeating cyclic count of said data processing apparatus having time increments in the cyclic count numbered in sequence from zero comprising the steps of storing a number for each function in the data processing apparatus representing the number of time increments in the scan of time between occurrences of each function, limiting the repeating cyclic count of the data processing apparatus to a number the same as or a multiple of the number of increments in the scan time number for the least frequently occurring of the control functions, storing a number for each function in the data processing apparatus representing the phase relation of the time increment of occurrence of each function with respect to the zero increment in the cyclic count, connecting the data processing apparatus to separately mathematically combine the sequence number of the cyclic count as the cycle progresses with the stored phase number of each control function and to divide the resulting combined number for each function by the corresponding stored scan time number for that function, and connecting the data processing apparatus to check the resulting quotients for an integer and to select a control function having an integer quotient for operation at that time increment in said cyclic count, enumerated in sequence up from the zero increment

18. The method as defined in claim 17 which further includes designating the mathematical operation sign for combining the sequence number with the phase number as positive when the increments in the cyclic count are enumerated and as negative when the increments in the cyclic count are enumerated in sequence down toward the zero increment, and further designating the phase number sign as positive when the phase is expressed as the number of increments occurring in the cyclic count before arriving at the zero increment in the direction of enumeration and as negative when the phase is expressed as the number of increments occurring in the cyclic count after arriving at the zero increment in the direction of enumeration.